(12) United States Patent
Schwartz et al.

(10) Patent No.: US 12,384,557 B2
(45) Date of Patent: Aug. 12, 2025

(54) SYSTEM AND METHOD FOR TAXIING OPERATIONS IN MULTI-ENGINE AIRCRAFT

(71) Applicant: The Boeing Company, Arlington, VA (US)

(72) Inventors: Samantha A. Schwartz, Castle Pines, CO (US); Garoe Gonzalez, Frankfurt (DE)

(73) Assignee: THE BOEING COMPANY, Arlingotn, VA (US)

( * ) Notice: Subject to any disclaimer, the term of this patent is extended or adjusted under 35 U.S.C. 154(b) by 259 days.

(21) Appl. No.: 18/163,678

(22) Filed: Feb. 2, 2023

(65) Prior Publication Data
US 2024/0262527 A1 Aug. 8, 2024

(51) Int. Cl.
*B64D 45/00* (2006.01)
*B64F 1/00* (2024.01)

(52) U.S. Cl.
CPC .............. *B64D 45/00* (2013.01); *B64F 1/002* (2013.01)

(58) Field of Classification Search
CPC ............ B64D 45/00; B64D 2045/0085; B64D 31/02; B64D 43/00; B64D 2205/00; B64F 1/002; G08G 5/0021; G08G 5/065; F05D 2270/07; F05D 2270/11; F05D 2270/13; F02C 7/26
See application file for complete search history.

(56) References Cited

U.S. PATENT DOCUMENTS

| | | | |
|---|---|---|---|
| 8,676,399 B2 * | 3/2014 | Nutaro | G08G 5/0091 701/16 |
| 9,105,186 B2 * | 8/2015 | Gayraud | G08G 5/0043 |
| 11,410,056 B1 * | 8/2022 | Xu | G07C 5/085 |
| 2015/0311832 A1 * | 10/2015 | Solodovnik | H04L 12/433 318/51 |
| 2017/0008618 A1 * | 1/2017 | Cox | B64C 25/405 |
| 2019/0213897 A1 | 7/2019 | Jayathirtha et al. | |
| 2021/0366297 A1 | 11/2021 | Peukert et al. | |
| 2023/0260412 A1 * | 8/2023 | Buisson | G08G 5/0021 701/120 |

* cited by examiner

*Primary Examiner* — Rami Khatib
(74) *Attorney, Agent, or Firm* — The Small Patent Law Group LLC; Josef L. Hoffmann (57) ABSTRACT

A system and method for determining which engine of an aircraft to start first for a taxiing operation and/or for estimating a total amount of fuel needed by the aircraft for conducting the taxiing operation includes receiving or accessing historical fuel usage data for each of the first and second engines, receiving or accessing taxiway information, determining which of the first and second engines to start before the other based on optimizing one or more predetermined factors, and producing a first-to-start alert indicating which of the first and second engines is a first-to-start engine. An engine use plan may be determined, the total amount of fuel needed for executing the taxiing operation may be estimated, and a fuel-estimate indication may be produced.

20 Claims, 6 Drawing Sheets

SYSTEM AND METHOD FOR TAXIING OPERATIONS IN MULTI-ENGINE AIRCRAFT

INTRODUCTION

This disclosure relates generally to aircraft taxiing operations, and more particularly to systems and methods for taxiing operations in multi-engine aircraft.

When conducting taxiing operations with aircraft having two or more engines, it is customary practice to perform a procedure known as a reduced-engine taxiing operation ("RETO") in which only one engine is used for taxiing on the tarmac. This is done because only one engine is required to propel the aircraft along the tarmac, such as from a terminal gate to a departing runway, and such single-engine operation saves more fuel than using more than one engine.

It is also customary practice in RETO situations for the pilot to randomly select which of the two engines to start first. Without reliance on data to support this start-up decision, the pilot's choice of which engine to start first may unwittingly and detrimentally cause more fuel to be used than if the other engine were started first.

SUMMARY

According to a first embodiment, a method is provided for determining which engine of an aircraft having a first engine and a second engine to start first for a taxiing operation along a taxiway at an airport. The method includes: (i) receiving or accessing historical fuel usage data for each of the first and second engines; (ii) receiving or accessing taxiway information for the taxiing operation; (iii) determining which of the first and second engines to start before the other of the first and second engines, thereby defining a first-to-start engine and a second-to-start engine, respectively, based on optimizing one or more predetermined factors; and (iv) producing a first-to-start alert indicating which of the first and second engines is the first-to-start engine.

According to a second embodiment, a system is provided for determining which engine of an aircraft having a first engine and a second engine to start first for a taxiing operation along a taxiway at an airport. The system includes a determination module and an indication module operatively connected with the determination module. The determination module has a memory configured to store an instruction set and processing circuitry configured to access the memory and execute the instruction set to: (i) receive or access historical fuel usage data for each of the first and second engines; (ii) receive or access taxiway information for the taxiing operation; (iii) determine which of the first and second engines to start before the other of the first and second engines, thereby defining a first-to-start engine and a second-to-start engine, respectively, based on optimizing one or more predetermined factors; and (iv) produce a first-to-start alert signal based on which of the first and second engines is the first-to-start engine. The indication module is configured to receive the first-to-start alert signal and produce a first-to-start alert based on the first-to-start alert signal.

According to a third embodiment, a method is provided for estimating a total amount of fuel needed by an aircraft for conducting a taxiing operation along a taxiway at an airport, with the aircraft having a first engine and a second engine. The method includes: (i) receiving or accessing historical fuel usage data for each of the first and second engines; (ii) receiving or accessing taxiway information for the taxiing operation; (iii) determining which of the first and second engines to start before the other of the first and second engines, thereby defining a first-to-start engine and a second-to-start engine, respectively, based on optimizing one or more predetermined factors; (iv) determining an engine use plan for executing the taxiing operation based on the optimizing of the one or more predetermined factors, wherein the engine use plan includes starting the first-to-start engine at a first timepoint, running the first-to-start engine for a first time period after the first timepoint, starting the second-to-start engine at a second timepoint at or after an end of the first time period, and running the first-to-start and second-to-start engines for a second time period after the second timepoint; (v) estimating the total amount of fuel needed for executing the taxiing operation based on the engine use plan; and (vi) producing a fuel-estimate indication indicating the estimated total amount of fuel needed.

According to a fourth embodiment, a system is provided for estimating a total amount of fuel needed by an aircraft for conducting a taxiing operation along a taxiway at an airport, with the aircraft having a first engine and a second engine. The system includes a determination module and an indication module operatively connected with the determination module. The determination module has a memory configured to store an instruction set and processing circuitry configured to access the memory and execute the instruction set to: (i) receive or access historical fuel usage data for each of the first and second engines; (ii) receive or access taxiway information for the taxiing operation; (iii) determine which of the first and second engines to start before the other of the first and second engines, thereby defining a first-to-start engine and a second-to-start engine, respectively, based on optimizing one or more predetermined factors; (iv) determine an engine use plan for executing the taxiing operation based on the optimizing of the one or more predetermined factors, wherein the engine use plan includes starting the first-to-start engine at a first timepoint, running the first-to-start engine for a first time period after the first timepoint, starting the second-to-start engine at a second timepoint at or after an end of the first time period, and running the first-to-start and second-to-start engines for a second time period after the second timepoint; (v) estimate the total amount of fuel needed for executing the taxiing operation based on the engine use plan; and (vi) produce a fuel-estimate indication signal based on the estimated total amount of fuel needed. The indication module is configured to receive the fuel-estimate indication signal and produce a fuel-estimate indication based on the fuel-estimate indication signal.

In the above first embodiment, the method may include determining an engine use plan for executing the taxiing operation based on the optimizing of the one or more predetermined factors, wherein the engine use plan includes starting the first-to-start engine at a first timepoint, running the first-to-start engine for a first time period after the first timepoint, starting the second-to-start engine at a second timepoint at or after an end of the first time period, and running the first-to-start and second-to-start engines for a second time period after the second timepoint. Similarly, in the above second embodiment, the determination module may be further configured to determine an engine use plan for executing the taxiing operation based on the optimizing of the one or more predetermined factors, wherein the engine use plan includes starting the first-to-start engine at a first timepoint, running the first-to-start engine for a first time period after the first timepoint, starting the second-to-start engine at a second timepoint at or after an end of the first time period, and running the first-to-start and second-to-start engines for a second time period after the second timepoint.

In the above first embodiment, the method may include estimating a total amount of fuel needed for executing the taxiing operation based on the engine use plan, and optionally may additionally include one or both of producing a fuel-estimate indication signal based on the estimated total amount of fuel needed and producing a fuel-estimate indication indicating the estimated total amount of fuel needed. Similarly, in the above second embodiment, the determination module may be further configured to estimate a total amount of fuel needed for executing the taxiing operation based on the engine use plan, and optionally may be further configured to produce a fuel-estimate indication signal based on the estimated total amount of fuel needed, and the indication module may be configured to produce a fuel-estimate indication based on the fuel-estimate indication signal.

In one or both of the above first and third embodiments, the method may include producing a first-to-start alert signal based on the determining of which of the first and second engines is the first-to-start engine. Similarly, in the above fourth embodiment, the determination module may be further configured to produce a first-to-start alert signal based on which of the first and second engines is the first-to-start engine. Additionally, in the above third embodiment, the method may include producing a first-to-start alert indicating which of the first and second engines is the first-to-start engine, and in the above fourth embodiment, the indication module may be further configured to produce a first-to-start alert based on the first-to-start alert signal.

In one or both of the above first and third embodiments, the method may further include receiving or accessing historical fuel use records for one or more previous instances of the taxiing operation, wherein the historical fuel use records are for the aircraft and/or for other aircraft. Similarly, in one or both of the above second and fourth embodiments, the determination module may be further configured to receive or access historical fuel use records for one or more previous instances of the taxiing operation, wherein the historical fuel use records are for the aircraft and/or for other aircraft.

In one or both of the above first and third embodiments, the method may further include producing a first-start-ready alert indicating a first OK-to-proceed condition for starting the first-to-start engine, and optionally may further include producing a second-start-ready alert indicating a second OK-to-proceed condition for starting the second-to-start engine. Additionally, in one or both of the above first and third embodiments, the method may further include producing a first-start-ready alert signal based on the engine use plan, and optionally may further include producing a second-start-ready alert signal based on the engine use plan.

In one or both of the above second and fourth embodiments, the indication module may be further configured to produce a first-start-ready alert indicating a first OK-to-proceed condition for starting the first-to-start engine, and optionally may be further configured to produce a second-start-ready alert indicating a second OK-to-proceed condition for starting the second-to-start engine. Additionally, in one or both of the above second and fourth embodiments, the determination module may be further configured to produce a first-start-ready alert signal based on the engine use plan, and optionally may be further configured to produce a second-start-ready alert signal based on the engine use plan.

In one or both of the above first and third embodiments, the method may further include starting the first-to-start engine, and optionally may further include starting the second-to-start engine. Similarly, one or both of the above second and fourth embodiments, the determination module may be further configured to start the first-to-start engine, and optionally may be further configured to start the second-to-start engine.

In one or more of the above embodiments, the predetermined factors may include one or more of minimizing a total amount of fuel consumed for executing the taxiing operation by the first and second engines, prioritizing whichever of the first and second engines was started first in a most previous operating cycle, prioritizing whichever of the first and second engines has a lower number of cumulative operating hours, and minimizing brake wear for the aircraft based on a number of turns present in the taxiway.

In one or more of the above embodiments, the taxiway may include a plurality of taxiway features including one or more of a taxiway segment, a runway, an ascending ramp, a descending ramp, a divot and a turn, wherein each taxiway feature is associated with a respective subset of the taxiway information. Each subset of the taxiway information may include one or more of a respective set of latitude-longitude coordinates representing a location of the associated taxiway feature, a respective set of one or more vectors representing a spatial orientation of the associated taxiway feature, a respective size of the associated taxiway feature, a respective shape of the associated taxiway feature, a respective slope of the associated taxiway feature, a respective elevation of the associated taxiway feature, a respective type of the associated taxiway feature, and a respective severity rating of how the associated taxiway feature affects movement of the aircraft thereacross.

In one or more of the above embodiments, the taxiway information may include one or both of historical data from previous Notice to Air Mission (NOTAM) reports and real-time data from current NOTAM reports.

In one or more of the above embodiments, the first-to-start alert, the second-to-start alert, the first-start-ready alert, the second-start-ready alert and the fuel estimate indication may each comprise one or more of a visual indication on a display device, an auditory indication through an auditory device, and a vibratory indication from a vibrational device.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

Referring now to the drawings, wherein like numerals indicate like parts in the several views, various configurations and embodiments are shown and described herein of a system 120 and method 260 for determining which engine of an aircraft 12 having a first engine 14 and a second engine 16 to start first for a taxiing operation 10 along a taxiway 104 at an airport 78, and of a system 430 and method 440 for estimating a total amount of fuel needed 254 by the aircraft 12 for conducting the taxiing operation 10.

In the drawings and in the following specification, four different but related configurations or embodiments are presented. In the first and second embodiments, a method 260 and a system 120, respectively, are provided for determining which engine of an aircraft 12 having a first engine 14 and a second engine 16 to start first for a taxiing operation 10 along a taxiway 104 at an airport 78. And in the third and fourth embodiments, a method 440 and system 430, respectively, are provided for estimating a total amount of fuel needed 254 by the aircraft 12 for conducting the taxiing operation 10.

In contrast with the abovementioned customary practices, the systems 120, 430 and methods 260, 400 of the present disclosure address the technical problem of knowing which of the two engines 14, 16 is the optimum one to start first for a taxiing operation 10 and knowing the total amount of fuel needed for the taxiing operation 10, by the technical effect of determining or calculating which of the first and second engines 14, 16 should be a first-to-start engine 17 and which should be a second-to-start engine 19 based on specific criteria, and what impact this determination has on the total amount of fuel consumed, thereby providing significant benefits and technical advantages which are not taught or suggested by other known approaches. These benefits and technical advantages include freeing up the pilot from the effort, distraction and stress of figuring out which of the two engines 14, 16 is the better one to start first for a taxiing operation 10 and how fuel will be utilized, thus removing a potential source of pilot error and optimizing fuel savings.

Figure 1:
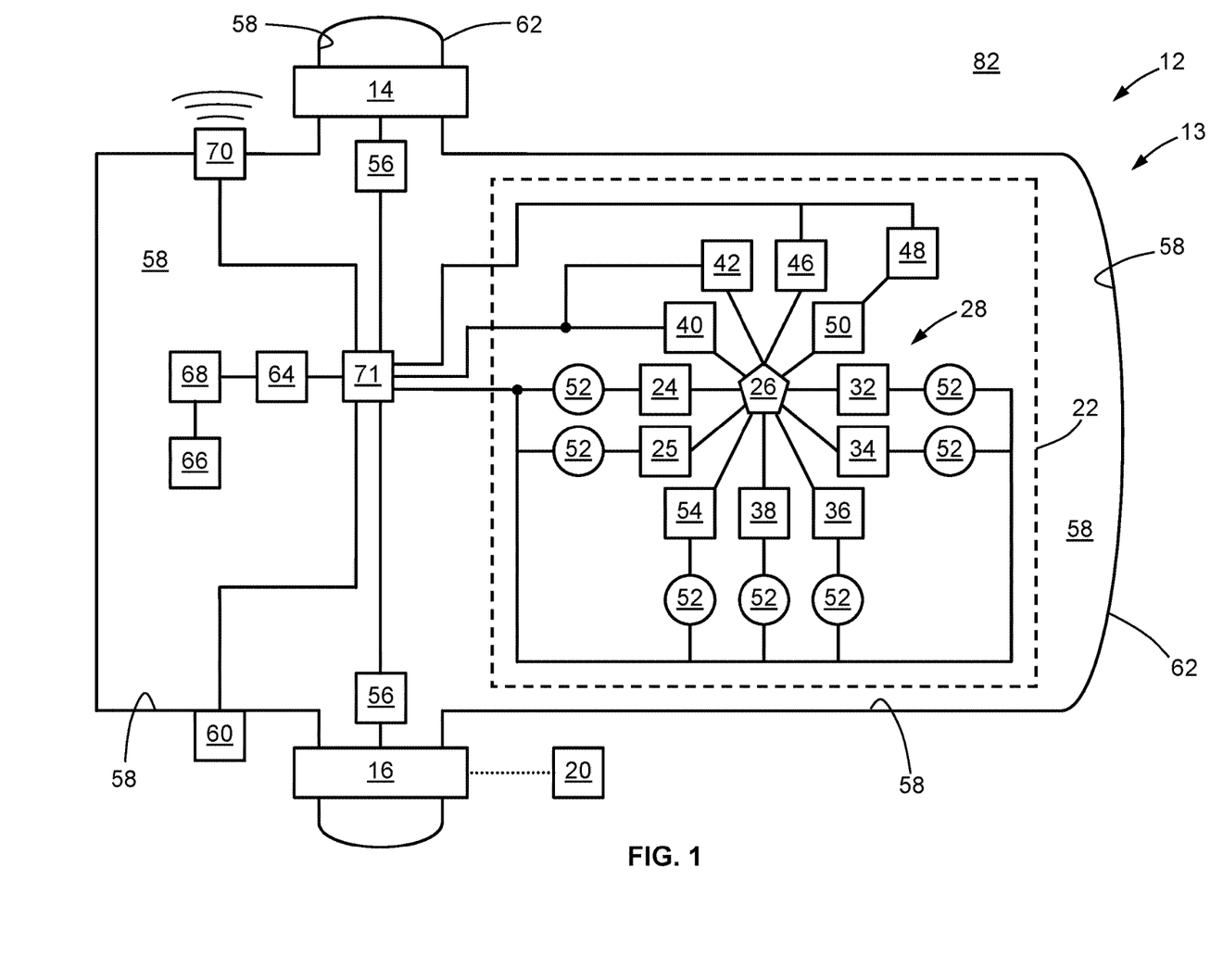
FIG. 1 is a block diagram of an aircraft.
Figure 2:
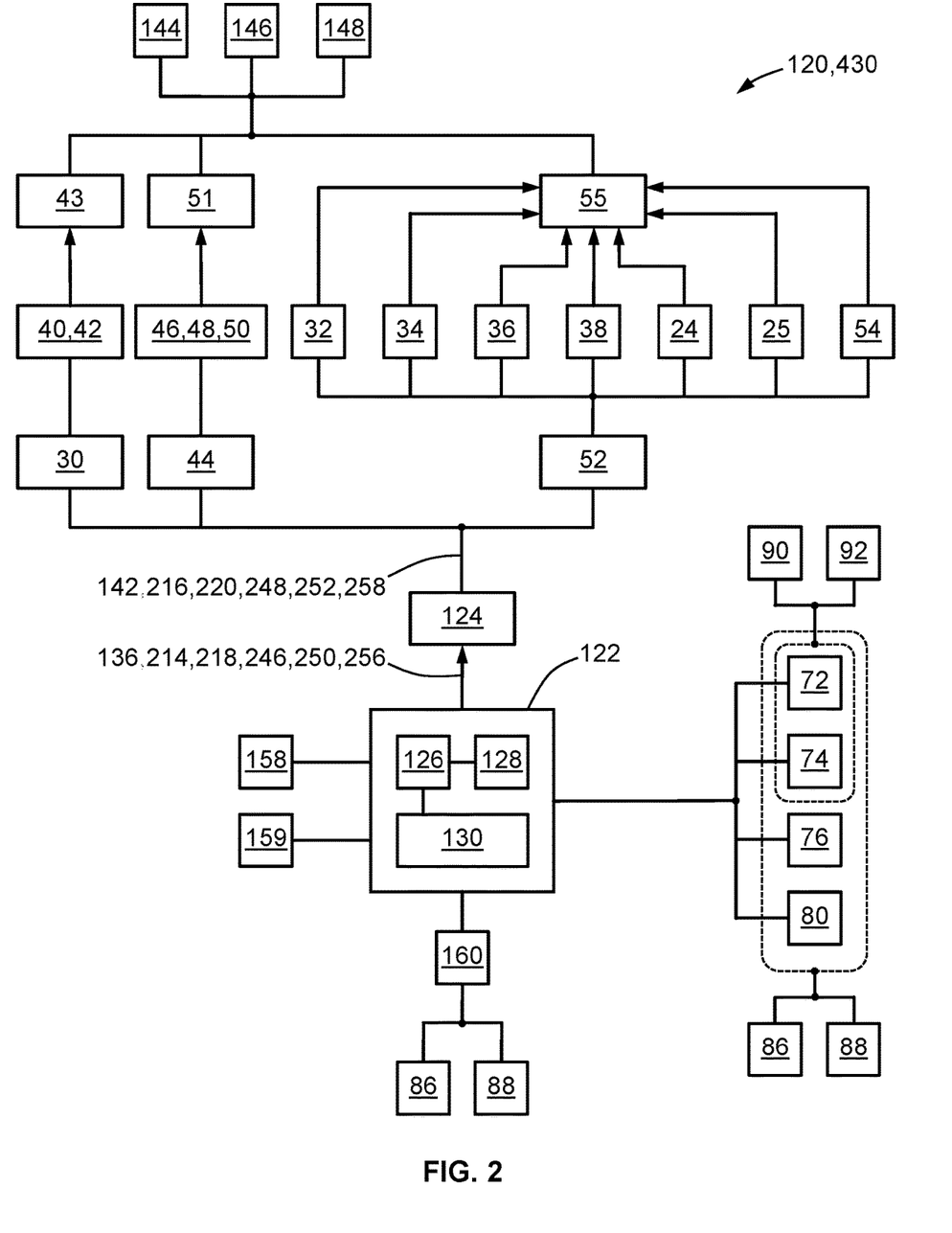
FIG. 2 is a block diagram of a system according to the present disclosure.

FIGS. 1 and 2 show block diagrams of an aircraft 12 and a system 120 used onboard or in conjunction with the aircraft 12, respectively, for supporting a taxiing operation 10 of the aircraft 12 at an airport 78 situated within an outside environment 82. The taxiing operation 10 may include a reduced-engine taxiing operation ("RETO") 18, but may also include other types of taxiing operations 10. The aircraft 12 may be a fixed-wing airplane belonging to an aircraft category 13, which is a categorization, grouping or population of individual aircrafts that share common characteristics, such as manufacturer, model number, number and type of engines, etc. The aircraft 12 has at least a first engine 14 and a second engine 16, with the aircraft 12 being capable of performing the taxiing operation 10. The second engine 16 (and optionally the first engine 14 as well) belongs to an engine category 20, which is a categorization, grouping or population of individual engines sharing common characteristics, such as manufacturer, model number, engine displacement, etc.

It may be noted that while individual engines within an engine category 20 will have certain characteristics that are the same for all the engines in that category 20, there may be some characteristics which vary from one individual engine to another, such as age, number of service hours and maintenance/repair history. Similarly, while individual aircrafts within an aircraft category 12 will have certain characteristics that are the same for all the aircrafts in that category 12, there may be some characteristics which vary from one individual aircraft to another, such as age, number of service hours, maintenance/repair history and the like.

The aircraft 12 includes a cockpit 22 containing a seat 24 in which a pilot 26 may sit. The cockpit 22 may also include various control devices 28 and display devices 30 with which the pilot 26 may interact. For example, the control devices 28 may include a steering yoke 32, a throttle lever 34, a control stick 36 (which may include or be called a control lever and/or a joystick) and one or more control pedals 38 (such as for controlling the rudder and/or brakes). The display devices 30 may include a heads-up display ("HUD") 40 which the pilot 26 may wear in the form of goggles, glasses, a visor, etc., as well as one or more display screens 42 mounted within the cockpit 22. The HUD 40 and display screens 42 may be wired or wireless. Each of the display devices 30 may be configured for displaying one or more visual indications 43 thereon. These visual indications 43 may be in the form of text, icons, symbols or the like, which may be shown in special renderings such as special colors, large text and/or in a flashing, pulsing, moving or rotating format in order to attract a pilot's attention.

The cockpit 22 may additionally include one or more auditory devices 44 which are configured to emit sound(s) for the benefit and/or the attention of the pilot 26. For example, the auditory devices 44 may include a speaker/loudspeaker 46 mounted within the cockpit 22, and/or a speaker 48 mounted in a headset 50 which the pilot 26 may wear. (As used here, the "headset" may include an in-the-ear, on-the-ear or around-the-ear earset, a set of headphones and a set of one or more earplugs/earphones.) The speakers 46, 48 and headset 50 may be wired or wireless. Each of the auditory devices 44 may be configured for emitting one or more auditory indications 51 therefrom. These auditory indications 51 may be sounds in the form of beeps, chirps, speech or the like, which may be emitted in special renderings such as special sounds, increased volume and/or in a pulsing or undulating auditory format in order to attract a pilot's attention.

The cockpit 22 may further include one or more vibrational devices 52 which are configured to emit vibrations, buzzes or the like for the benefit and/or the attention of the pilot 26. For example, the vibrational device 52 may be a piezo-electric element which converts an electrical signal into mechanical vibration. These vibrational devices 52 may be attached to or embedded within one or more of the steering yoke 32, the throttle lever 34, a control lever/control stick/joystick 36, the one or more control pedals 38, a footrest 54 (including a footrest area in the footwell of the cockpit 22), the pilot's seat 24, and any other suitable location or device 25 within the cockpit 22. In addition to producing vibrations which the pilot 26 may feel, the vibrational device 52 may optionally also be capable of producing one or more sounds which the pilot 26 is capable of hearing. Each of the vibrational devices 52 may be configured for emitting one or more vibratory indications 55 therefrom. These vibratory indications 55 may be vibrations, pulses, buzzes or the like, which may be emitted in special renderings such as special sequences or patterns, or pulses that are rising, falling, undulating, abrupt, etc., in order to attract a pilot's attention.

Each of these display devices 30, auditory devices 44 and vibratory devices 52 may be used to provide visual indications 43, auditory indications 51 and vibrational indications 55, respectively, so as to provide an alert 142 to the pilot 26 regarding which of the first and second engines 14, 16 to start first and/or what the total amount of fuel needed 254 is for conducting the taxiing operation 10, as described in more detail below.

The aircraft 12 may include one or more internal sensors 56 located within the interior 58 of the aircraft 12, one or more external sensors 60 located on the exterior 62 of the aircraft 12, one or more accessing/processing circuits 64 within the interior 62 of the aircraft 12 which are configured to access or retrieve stored information 66 from a storage medium 68 located within the interior 58 of the aircraft 12, and/or one or more transceivers 70 which in whole or in part may be located within the interior 58 of the aircraft 12 and/or on the exterior 62 of the aircraft 12. These sensors 56, 60, circuits 64 and transceivers 70 may be controlled by one or more controllers 71 for handling the storage, retrieval and flow of signals and information among these and other devices aboard the aircraft 12. Note that as used herein, the "interior" 58 of the aircraft 12 includes locations that are within the cockpit 22, within the passenger/cargo areas, within the engines 14, 16 and anywhere within the entirety of the aircraft 12 and which is not directly exposed to the outer atmosphere outside the aircraft 12. Similarly, the "exterior" 62 of the aircraft 12 includes all other locations that are not within the interior 58, such as any locations on or outside of the outer skin or outer boundary surfaces of the aircraft 12, and any locations that are directly exposed to the outer atmosphere outside the aircraft 12. Further, note that while FIG. 1 shows the accessing/processing circuit 64, the stored information 66, the storage medium 68, a portion of the transceiver 70 and the controller 71 as being located within the interior 58 of the aircraft 12 but outside the cockpit 22, this is merely for illustration purposes, as these elements may also be located within the cockpit 22.

The internal sensor(s) 56, the external sensor(s) 60, the accessing/processing circuit(s) 64 and the transceiver(s) 70 may cooperate together and be configured to sense or access various phenomena, characteristics, data and/or signals which convey various types of information. As illustrated at the lower-right of FIG. 2, and with reference to the airport 78 illustrated in FIG. 3, the aforementioned information may include engine-related information 72 relating to the second engine 16 (and/or to the engine category 20 to which the second engine 16 belongs), aircraft-related information 74 relating to the aircraft 12 (which may optionally include or exclude engine-related information 72), airport-related information 76 relating to the airport 78 at which the aircraft 12 is located, and/or environment-related information 80 relating to the outside environment 82 in which the airport 78 is located. For example, one or more internal sensors 56 and/or one or more external sensors 60 may be operatively associated with each engine 14, 16 in order to sense various engine-related information 72, such as the engine temperature, oil temperature and oil pressure for each engine 14, 16. Environment-related information 80 such as the outside air temperature, barometric pressure, humidity, dew point, wind speed, wind direction, visibility and the like may be sensed by one or more external sensors 60 and/or such information may be received onboard the aircraft 12 by one or more transceivers 70 (e.g., radios) from an external database, service or source 84. Such external databases, services or sources 84 may be commercial information sources that are encrypted, password-protected and subscription-based, or they may be information sources that are publicly available and free-of-charge. These external databases, services or sources 84 may be located on the premises of the airport 78, or they may be located some distance away from the premises of the airport 78.

As illustrated by the large dashed rounded rectangle at the lower-right of FIG. 2, the set of data and information making up the engine-related information 72, the aircraft-related information 74, the airport-related information 76 and the environment-related information 80 may include one or both of historical information 86 (which has been accumulated over time before a current moment) and real-time information 88 (which is sensed or accessed at the current moment in real time). Historical information 86 may be stored in the cloud, and may be accessible by the aircraft 12 from an external database, service or source 84 via a transceiver 70. Alternatively, the historical information 86 may be stored in the storage media 68 among the stored information 66, which may be accessible via the accessing/processing circuit 64. Additionally, historical information 86 may be received from an external database, service or source 84 by the transceiver 70 and stored as stored information 66 in the storage medium 68 with the aid of the controller 71.

As illustrated by the small dashed rounded rectangle at the lower-right of FIG. 2, the engine-related information 72 and the aircraft-related information 74 may each include one or both of instantial information 90, relating to the second engine 16 itself or to the aircraft 12 itself, and categorical information 92, relating to the engine category 20 to which the second engine 16 belongs or to the aircraft category 13 to which the aircraft 12 belongs. In other words, the engine-related information 72 may include instantial information 90 relating to the second engine 16 itself, and/or categorical information 92 relating to the engine category 20 to which the second engine 16 belongs. Similarly, the aircraft-related information 74 may include instantial information 90 relating to the individual aircraft 12 itself, and/or categorical information 92 relating to the aircraft category 13 to which the aircraft 12 belongs. It may be noted that while categorical information 92 definitionally relates to an aircraft category 13 or to an engine category 20, such information 92 may be viewed as also indirectly relating to an individual aircraft 12 or to an individual second engine 16, since the individual aircraft 12 or individual second engine 16 belongs to the respective aircraft category 13 or engine category 20. (Further, note that the descriptions above relating to the second engine 16 may likewise apply to the first engine 14 as well.)

The internal sensors 56, external sensors 60, accessing/processing circuits 64 and transceivers 70 may be utilized (optionally with the aid of the controller 71) to sense, receive or access the various types of historical information 86, real-time information 88, instantial information 90 and categorical information 92 mentioned above.

As illustrated in the block diagram of FIG. 2, the system 120 includes a determination module 122 and an indication module 124 operatively connected with the determination module 122. The determination module 122 includes a memory 126 configured to store an instruction set 128, and processing circuitry 130 configured to access the memory 126 and to retrieve and execute the instruction set 128. (The controller 71 illustrated in FIG. 1 (including one or more of the accessing/processing circuit 64, the storage medium 68 and the stored info 66) may include or comprise the determination module 122 illustrated in FIG. 2 (including one or more of the processing circuitry 130, the memory 126 and the instruction set 128), and vice versa.) The execution of the instruction set 128 by the processing circuitry 130, and/or the operation of the determination module 122, are configured so as to be effective to determine which of the first and second engines 14, 16 to start before the other of the first and second engines 14, 16, thereby defining a first-to-start engine 17 and a second-to-start engine 19, respectively (hereinafter a "determination" 123).

In order to make the determination 123 of which of the engines 14, 16 should be the first- and second-to-start engines 17, 19, the determination module/instruction set 122, 128 may be configured to receive or access historical fuel usage data 158 for each of the first and second engines 14, 16 and taxiway information 160 for the taxiing operation 10. Optionally, the determination module/instruction set 122, 128 may also be configured to receive or access historical fuel use records 159 for one or more previous instances 202 of the taxiing operation 10. Additionally, the determination module/instruction set 122, 128 may also be configured to determine which of the first and second engines 14, 16 should be started before the other, thereby defining the first-to-start (i.e., first-to-be-started) engine 17 and the second-to-start (i.e., second-to-be-started) engine 19, respectively, based on optimizing one or more predetermined factors 212. The determination module/instruction set 122, 128 may also be configured to produce an alert signal 136 based on the determination 123.

The historical fuel usage data 158 includes data pertaining to fuel usage by each engine 14, 16 during previous taxiing operations 10 (and optionally during other operations as well), such as total amount of fuel consumed during an operation, flow rates of fuel during the operation, duration of the operation, average fuel flow rate for an operation, fuel use efficiency for an operation, etc.

Figure 4:
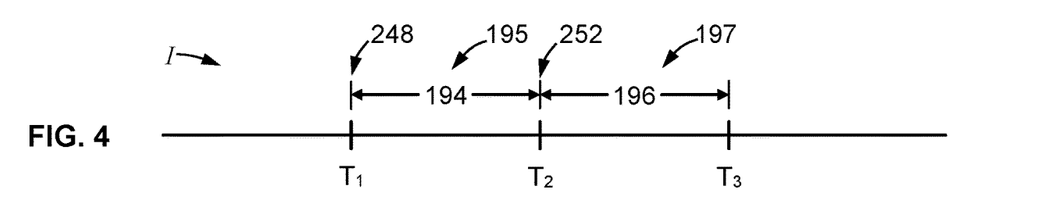
FIG. 4 is a first timeline of start-up and run times for the first and second engines according to the present disclosure.

The historical fuel use records 159 include records pertaining to fuel use during previous instances of the current, planned or contemplated taxiing operation 10 (and optionally during other taxiing operations 10 as well). These records 159 may pertain to the overall taxiing operation 10, and thus may include total measurements for both engines 14, 16 combined together. For example, historical fuel use records 159 may include the combined amount of fuel consumed during an operation, combined flow rates of fuel during the operation, duration of the operation, combined average fuel flow rate for an operation, combined fuel use efficiency for an operation, etc. Note that since the historical fuel use records 159 combines data/measurements from both engines 14, 16 over the course of a taxiing operation 10, the records 159 may include data/measurements coming from only one engine or the other during some portions of the taxiing operation 10. For example, as illustrated in the timeline of FIG. 4, at the beginning of a taxiing operation 10, a first-to-start engine 17 may run during a first time period 194 from a first timepoint $T_1$ to a second timepoint $T_2$, and a second-to-start engine 19 may begin running at the second timepoint $T_2$ until a third timepoint $T_3$, which defines a second time period 196 during which both engines 17, 19 are running for the taxiing operation 10. Thus, fuel would only be consumed by one engine (i.e., the first-to-start engine 17) during the first time period 194, whereas fuel would be consumed at a much higher rate during the second time period 196 when both engines 17, 19 would be running.

Figure 3:
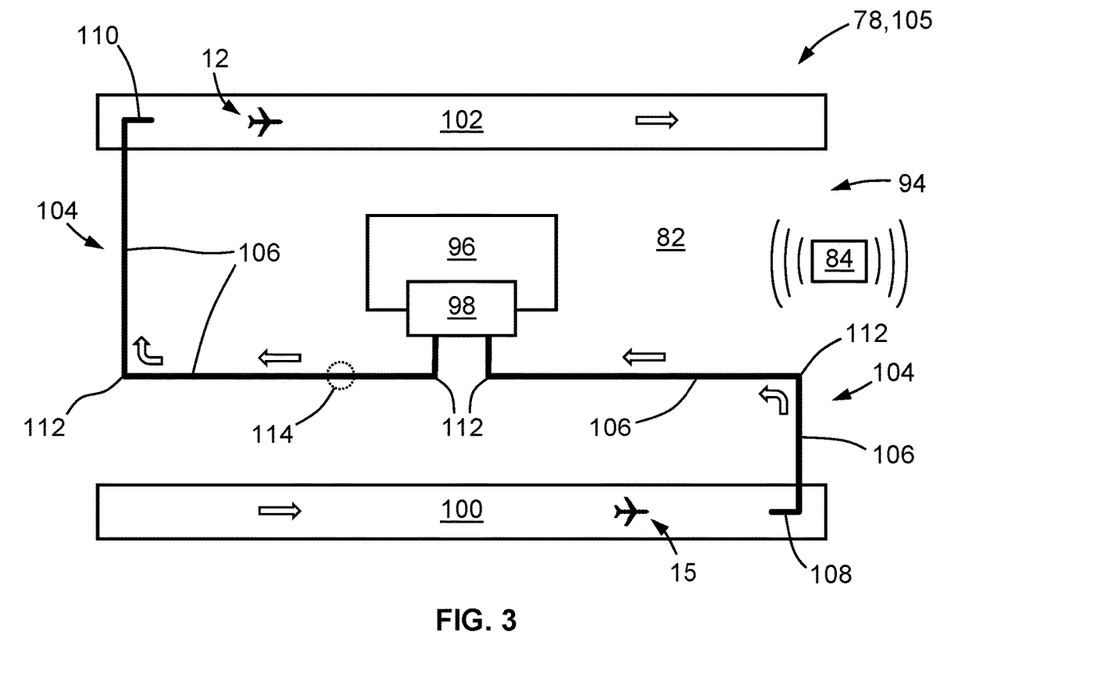
FIG. 3 is a schematic plan view of an airport at which the aircraft of FIG. 1 is located.
Figure 7:
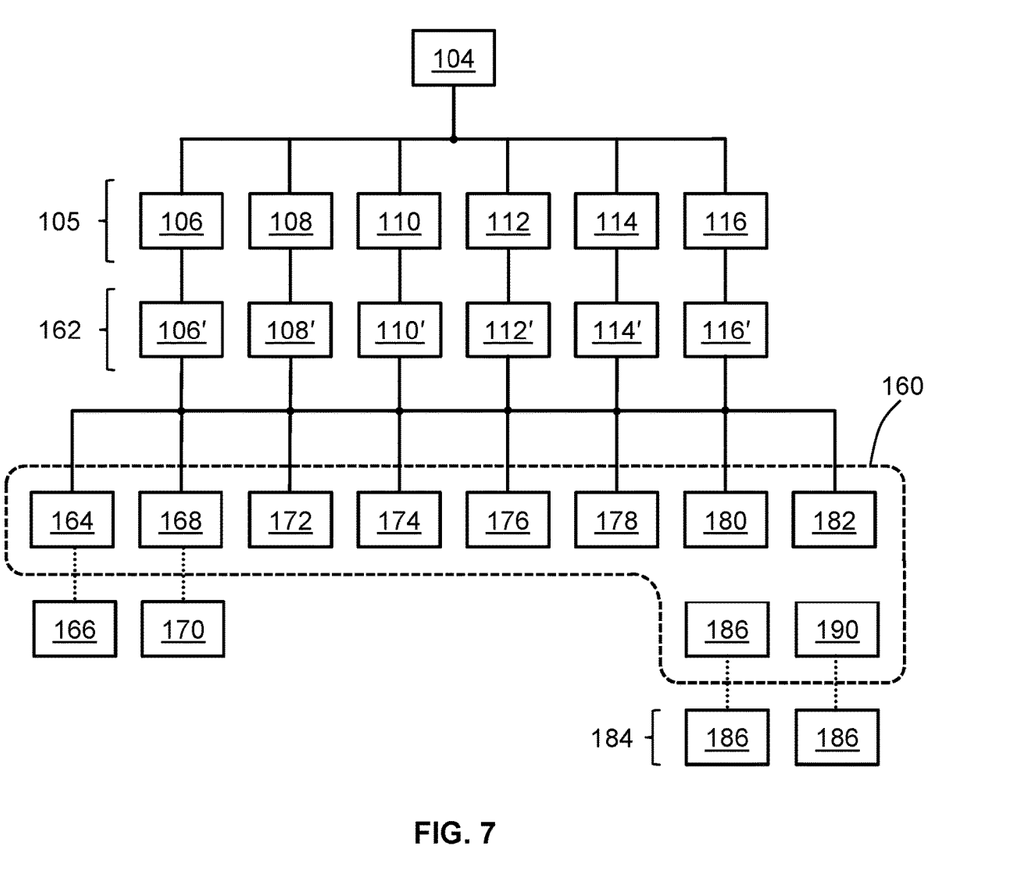
FIG. 7 is a block diagram of taxiway features for a taxiway.

The taxiway information 160 is illustrated in the block diagram of FIG. 7, with reference to the schematic diagram of the airport 78 and taxiway features 105 shown in FIG. 3.

In FIG. 3, the instant aircraft 12 and other aircraft 15 are shown at an airport 78. The airport 78 is located within a surrounding environment 82, which may have a geographical location with local weather conditions. For example, the environment 82 may have a municipal, corporate or private address with latitude and longitude coordinates and an elevation above sea level, with the environment 82 also having local readings of air temperature, barometric pressure, relative humidity, dew point, wind speed, wind direction, visibility and the like.

The airport 78 may operate and be governed by a set of standard operating procedures ("SOPs") 94, which may be a combination of rules, restrictions, permissions and guidelines promulgated by federal, state and/or local agencies for the safe operation of airport facilities. The airport 78 may include one or more terminals 96 each having one or more respective gates 98. The airport 78 additionally includes one or more arriving runways 100 and one or more departing runways 102, with a network of taxiways 104 directly or indirectly connecting each gate 98 with at least one arriving runway 100 and at least one departing runway 102. The network of taxiways 104 may include one or more taxiway segments 106, one or more ascending ramps or segments 108 (which rise in elevation), one or more descending ramps or segments 110 (which fall in elevation), one or more turns 112 and one or more divots 114 in the runways 100, 102 and/or in the taxiways 104. Note that while an ascending ramp or segment 108 is shown at the junction of one taxiway segment 106 and the arriving runway 100, and a descending ramp or segment 110 is shown at the junction of another taxiway segment 106 and the departing runway 102, such ramps 108, 110 may occur at other locations as well. Additionally, the runways 100, 102 and taxiways 104 may have various combinations of banking and/or crowning on their respective top surfaces.

In FIG. 7, a taxiway 104 is shown as comprising one or more taxiway features 105, such as one or more taxiway segments 106, one or more ascending ramps/segments 108, one or more descending ramps/segments 110, one or more turns 112, one or more divots 114, and one or more other taxiway features 116. Each of these taxiway features 105— i.e., 106, 108, 110, 112, 114 and 116—may be associated with a respective subset 162 of the taxiway information 160—i.e., 106', 108', 110', 112', 114' and 116', respectively. The taxiway information 160, illustrated by the dashed rounded rectangle, is a collection of information about various characteristics of the taxiway features 105, such as: (i) the set of latitude-longitude coordinates 164 representing the location 166 of a taxiway feature 105, (ii) the set of one or more vectors 168 representing or characterizing a spatial orientation or directionality 170 of a taxiway feature 105, (iii) the size 172 of a taxiway feature 105, (iv) the shape 174 of a taxiway feature 105, (v) the slope 176 of a taxiway feature 105, (vi) the elevation 178 of a taxiway feature 105, (vii) the type 180 of a taxiway feature 105, and (viii) the severity or impact rating 182 of how a taxiway feature 105 is likely to affect movement of the aircraft 12 across the taxiway feature 105.

Each subset 162 of the taxiway information 160 may include one or more of the abovementioned characteristics.

For example, if a given taxiway 104 has four taxiway segments 106, then the subset 106' associated with the four taxiway segments 106 may include four sets of latitude-longitude coordinates 164 for the respective locations 166 of the four segments 106, four set of vectors 168 representing or characterizing the respective spatial orientation or directionality 170 of the four segments, a respective size 172 and shape 174 for each of the four segments, etc.

Figure 5:
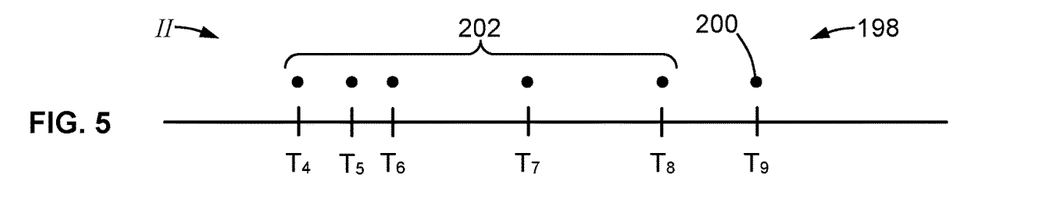
FIG. 5 is a second timeline of taxiing operation instances according to the present disclosure.
Figure 6:
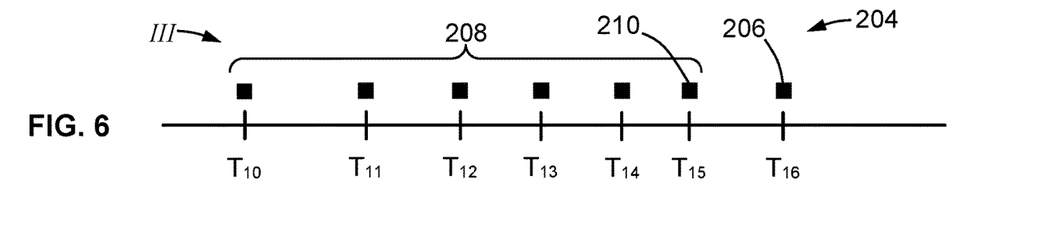
FIG. 6 is a third timeline of operating cycles for the first and second engines according to the present disclosure.

FIGS. 4-6 show various timelines for running the first and second engines 14, 16 during taxiing operations 10 at an airport 78 according to the present disclosure. More specifically, FIG. 4 shows a first timeline I of start-up and run times for the first and second engines 14, 16, FIG. 5 shows a second timeline II of various instances 198 of the taxiing operation 10, and FIG. 6 shows a third timeline III of various operating cycles 204 for the first and second engines 14, 16. In some cases, at least some of the events and/or timepoints illustrated in FIGS. 4-6 may coincide and/or align with each other, but in other cases few or none of the events and timepoints may coincide and/or align with each other.

In FIG. 4, a first time period 194 extends from a first timepoint $T_1$ to a second timepoint $T_2$, and a second time period 196 extends from the second timepoint $T_2$ to a third timepoint $T_3$. The first time period 194 represents a first OK-to-proceed condition 195 for starting the first-to-start engine 17, and the second time period 196 represents a second OK-to-proceed condition 197 for starting the second-to-start engine 19.

In FIG. 5, several individual instances or occurrences 198 of the taxiing operation 10 are represented by the dots shown at the fourth, fifth, sixth, seventh, eighth and ninth timepoints $T_4$, $T_5$, $T_6$, $T_7$, $T_8$, $T_9$. A current instance 200 is shown occurring at the ninth timepoint $T_9$, with multiple previous instances 202 shown occurring at the fourth through eighth timepoints $T_1$-$T_8$. Note that each instance 198 in FIG. 5 may include respective first and second time periods 194, 196 as illustrated in FIG. 4; thus, the second timeline II of FIG. 5 shows a longer span of time than does the first timeline I of FIG. 4.

In FIG. 6, several individual operating cycles 204 of the engines 14, 16 are represented by the squares shown at the tenth, eleventh, twelfth, thirteenth, fourteenth, fifteenth and sixteenth timepoints $T_{10}$, $T_{11}$, $T_{12}$, $T_{13}$, $T_{14}$, $T_{15}$, $T_{16}$. Each operating cycle 204 may include a taxiing operation 10 as well as other operations of the engines 14, 16. A current operating cycle 206 is shown occurring at the sixteenth timepoint $T_{16}$, with multiple previous operating cycles 208 shown occurring at the tenth through fifteenth timepoints $T_{10}$-$T_{15}$, including a most previous operating cycle 210 immediately prior to the current operating cycle 206.

Figure 8:
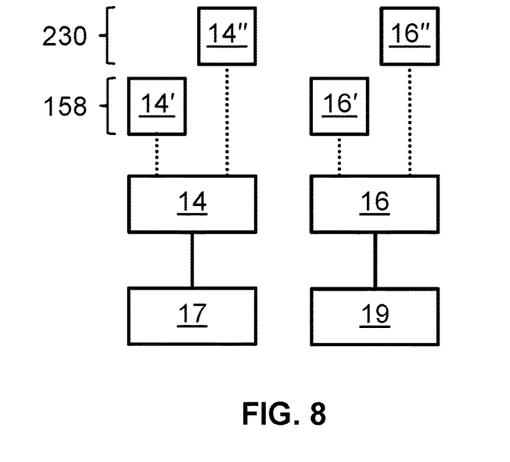
FIGS. 8-9 are block diagrams illustrating how each of the first and second engines of an aircraft may be designated as a first-to-start engine or a second-to-start engine according to the present disclosure.
Figure 9:
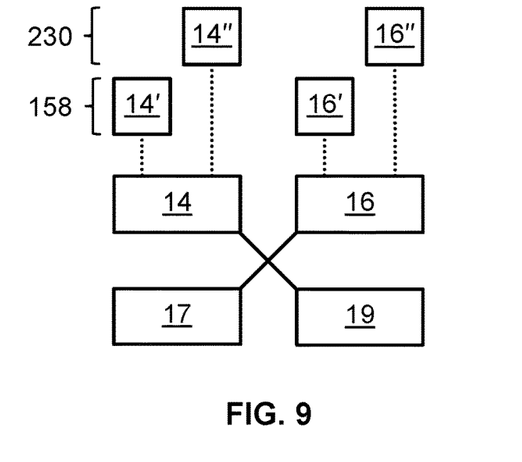

FIGS. 8-9 show block diagrams illustrating how each of the first and second engines 14, 16 may be designated as a first-to-start engine 17 or a second-to-start engine 19. For example, in FIG. 8, the determination 123 has resulted in the first engine 14 being recommended to be the first-to-start engine 17 and the second engine 16 being the second-to-start engine 19, as indicated by the solid lines connecting block 14 to block 17 and block 16 to block 19. On the other hand, in FIG. 9, the determination 123 has resulted in the second engine 16 being recommended to be the first-to-start engine 17 and the first engine 14 being the second-to-start engine 19, as indicated by the solid lines connecting block 16 to block 17 and block 14 to block 19. As noted above, the determination 123 as to whether a given engine 14, 16 should be the first-to-start engine 17 is determined by optimizing one or more of the predetermined factors 212. Each engine 14, 16 may also have or be associated with its own respective historical fuel usage data 14', 16' (both of which may be grouped together as parts of the collective group of historical fuel usage data 158) and its own respective number of cumulative operating hours 14", 16" (both of which may be grouped together as parts of the collective number of cumulative operating hours 230).

Figure 10:
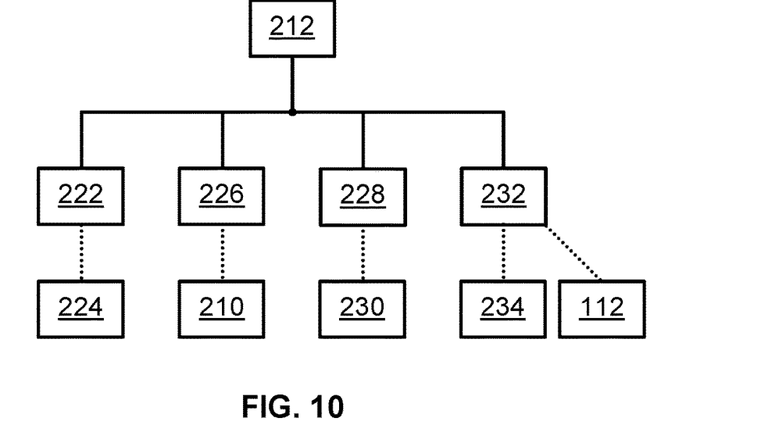
FIG. 10 is a block diagram of predetermined factors that may be optimized for determining which of the first and second engines is a first-to-start engine and which is a second-to-start engine according to the present disclosure.

FIG. 10 shows a block diagram of the predetermined factors 212 utilized by the determination module 122 to make the determination 123. These factors 212 may include one or more of: (i) at block 222, minimizing a total amount of fuel consumed 224 for executing the taxiing operation 10 by the first and second engines 14, 16; (ii) at block 226, prioritizing whichever of the first and second engines 14, 16 was started first in a most previous operating cycle 210; (iii) at block 228, prioritizing whichever of the first and second engines 14, 16 has a lower number of cumulative operating hours 230; and (iv) at block 232, minimizing brake wear 234 for the aircraft 12 based on a number of turns 112 present in the taxiway 104.

As used herein, the determination 123 being based on "optimizing" one or more of the predetermined factors 212 means that the determination 123 or decision as to which of the engines 14, 16 should be identified as the first-to-start engine 17 is based on accomplishing the one or more predetermined factors 212 to the highest practical degree.

For example, if historical fuel use data 14' for the first engine 14 and historical fuel use data 16' for the second engine 16 indicate that during previous instances 202 of the taxiing operation 10 the first engine 14 consumed fuel at a higher rate than did the second engine 16, then optimizing the first of the predetermined factors 212 (represented by block 222) would result in identifying the second engine 16 to be the first-to-start engine 17 (to run during both the first and second time periods 194, 196) and the first engine 14 to be the second-to-start engine 19 (to run during only the second time period 196), because this combination would minimize the total amount of fuel consumed 224 for the taxiing operation 10.

As another example, if in the most previous operating cycle 210 the first engine 14 was started before the second engine 16, then according to the second of the predetermined factors 212 (represented by block 226), during the current operating cycle 206 the second engine 16 would be prioritized over the first engine 14; that is, the second engine 14 would be identified as the first-to-start engine 17 for the current operating cycle 206 of the taxiing operation 10.

As yet another example, if the cumulative operating hours 14" for the first engine 14 are lower than the cumulative operating hours 16" for the second engine 16, then according to the third of the predetermined factors 212 (represented by block 228), the first engine 14 should be the first-to-start engine 17, in order to balance out the engine wear as between the two engines 14, 16.

As yet a further example, if the taxiway 104 has more left turns that right turns (or vice versa) along the path that the aircraft 12 will take from the gate 98 to the departing runway 102, then according to the fourth of the predetermined factors 212 (represented by block 232), one of the engines 14, 16 would be prioritized over the other and selected to be the first-to-start engine 17 in order to minimize the overall brake wear 234 caused by the turns 112 along the taxiway 104.

In cases where more than one of the predetermined factors 212 are being considered and optimized, there may be situations in which two or more of the factors 212 conflict or compete with each other. For example, two of the factors 212 may indicate that the first engine 14 should be the first-to-start engine 17, and the other two factors 212 indicate that the second engine 16 should be the first-to-start engine 17. In such cases, a hierarchical, procedural, weighted or arbitrational scheme may be used to arbitrate or decide between or among the factors 212 in order to select which engine 14, 16 should be the first one to be started.

Optionally, the determination 123 may also utilize or be based on one or more of engine-related information 72, aircraft-related information 74, airport-related information 76, and environment-related information 80. For example, the instruction set 128 may include one or more algorithms that utilize the engine-related information 72, the aircraft-related information 74, the airport-related information 76, and/or the environment-related information 80 as inputs for the one or more algorithms.

The determination module 122 may receive or access the historical fuel usage data 158, historical fuel use records 159 and taxiway information 160 via the internal sensors 56, the external sensors 60, the accessing/processing circuits 64 and/or the transceivers 70. (For example, some portions of this data 158, records 159 and information 160 may be sensed by the internal or external sensors 56, 60, and other portions may be accessed via the accessing/processing circuits 64 (e.g., from the stored information 66 on the storage medium 68) or via the transceivers 70 (e.g., from an external database, service or source 84). Additionally, the indication module 124 is configured to receive the alert signal 136 and produce an alert 142 based on the alert signal 136. The alert signal 136 may be an analog signal, a digital signal or a combined analog and digital signal.

When the alert signal 136 is produced by the determination module 122 and is received by the indication module 124, the indication module 124 sends one or more other signals (which are different from the alert signal 136) to one or more display device 30, one or more auditory device 44 and/or one or more vibrational device 52, so as to produce one or more visual indications 43, one or more auditory indication 51 and/or one or more vibratory indications 55, respectively. These various indications 43, 51, 55 provide information to the pilot 26 regarding which engine 14, 16 is the first-to-start engine 17 and which is the second-to-start engine 19, when to start each engine 17, 19, etc.

The alert 142 may include or take the form of a visual indication 43 on a display device 30, an auditory indication 51 through an auditory device 44, and/or a vibratory indication 55 from a vibrational device 52. The alert 142 may also include or take the form of an indicator 144 of which engine 14, 16 to start first (i.e., which engine 14, 16 has been determined to be a first-to-start engine 17 and/or which is a second-to-start engine 19), a countdown 146 (indicating when to start the first-to-start engine 17 and/or the second-to-start engine 19), and/or a prompt 148 to start the first-to-start engine 17 and/or the second-to-start engine 19. Each of the visual, auditory and vibratory indications 43, 51, 55 may be provided in the form of a respective indicator 144, a respective countdown 146 or a respective prompt 148. It may be noted that the alert 142 may be presented in multiple forms or formats and at more than one singular time.

For example, after the determination 123 has been made by the determination module 122 as to which engine 14, 16 should be the first-to-start engine 17, the determination module 122 produces an alert signal 136 that is indicative of the determination 123. This alert signal 136 is received by the indication module 124, and the indication module 124 then produces an alert 142 which, like the alert signal 136, is indicative of the determination 123 made by the determination module 122. The alert 142 may optionally include a continuation of the alert 142 until the pilot 26 acknowledges the alert 142, such as by pressing a designated button or by starting the first-to-start engine 17.

Optionally, the determination module 122 may be configured to produce two or more alert signals 132, and the indication module 124 may be configured to receive the two or more alert signals 132 from the determination module 122 and to produce two or more alerts 142 which correspond to the two or more alert signals 136. Two or more alerts signals 136 and their corresponding alerts 142 may be utilized to indicate or signal two or more conditions or actions. In one example, alerts 142 may be presented at two different timepoints: (i) at a first timepoint $T_1$, one alert 142 may be presented as both an indicator 144 as to which engine 14, 16 should be the first-to-start engine 17 and as a prompt 148 to proceed with starting the first-to-start engine 17, and simultaneously another alert 124 may be presented as a countdown 146 until it is time to start the second-to-start engine 19; and (ii) at a second timepoint $T_2$ at the end of the countdown 146, another alert 142 may be presented as a prompt 148 to proceed with starting the second-to-start engine 19.

For instance, at the first timepoint $T_1$, a combination of three different forms of the alerts 142 may be simultaneously triggered: (i) an auditory indication 51 in the form of three short beeps may be emitted from an auditory device 44 (e.g., in a cockpit loudspeaker 46 and in a headset speaker 48); (ii) a flashing series of numbers showing a countdown 146 may be displayed as a visual indication 43 on a display device 30 (e.g., in the HUD 40 and on one or more display screens 42); and (iii) a vibratory indication 55 in the form of three short vibrational pulses may be emitted from one or more vibrational devices 52 (e.g., by piezo-electric elements embedded in the steering yoke 32, the throttle lever 34 and the control stick 36). Then, at the second timepoint $T_2$ (i.e., at the end of the countdown 146, when it is time to commence start-up of the second-to-start engine 19), another combination of three different forms of the alert 142 may be triggered: (iv) an auditory indication 51 in the form of one long beep may be emitted from an auditory device 44 (e.g., in a cockpit loudspeaker 46 and in a headset speaker 48); (v) the flashing series of numbers showing the countdown 146 may disappear and be replaced by a flashing icon displayed as a visual indication 43 on a display device 30 (e.g., in the HUD 40 and on one or more display screens 42); and (vi) a vibratory indication 55 in the form of one long vibrational pulse may be emitted from one or more vibrational devices 52 (e.g., by piezo-electric elements embedded in the steering yoke 32, the throttle lever 34 and the control stick 36). In this example, at the first timepoint $T_1$, the timing and cadence of the three short beeps may match the timing and cadence of the three short vibrational pulses, and at the second timepoint $T_2$, the timing and duration of the one long beep may match the timing and duration of the one long vibrational pulse. Other combinations of visual, auditory and vibratory indications 43, 51, 55 and indicators 144, countdowns 146 and prompts 148 utilizing the various control devices 28, display devices 30, auditory devices 44 and vibrational devices 52 are also possible.

Figure 11:
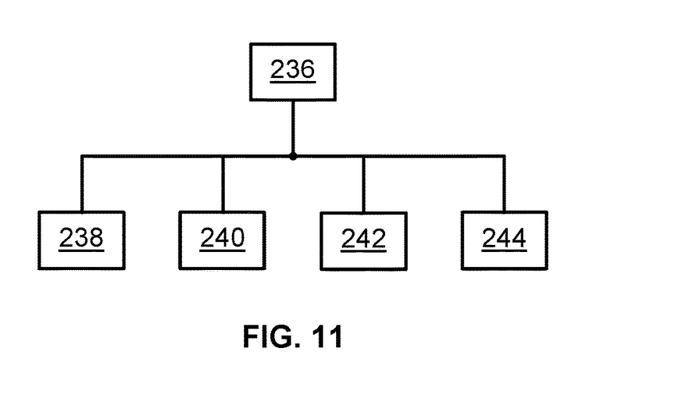
FIG. 11 is a block diagram showing components of an engine use plan according to the present disclosure.

FIG. 11 shows a block diagram of an engine use plan 236 for executing the taxiing operation 10 based on the optimizing of the one or more predetermined factors 212. With reference to the first timeline I of FIG. 4, the engine use plan 236 may include the sequence of steps or actions of: (i) starting the first-to-start engine 17 at a first timepoint $T_1$, (ii) running the first-to-start engine 17 for a first time period 194 after the first timepoint $T_1$, (iii) starting the second-to-start engine 19 at a second timepoint $T_2$ at or after an end of the first time period $T_1$, and (iv) running the first-to-start and second-to-start engines 17, 19 for a second time period 196 after the second timepoint $T_2$.

Figure 12:
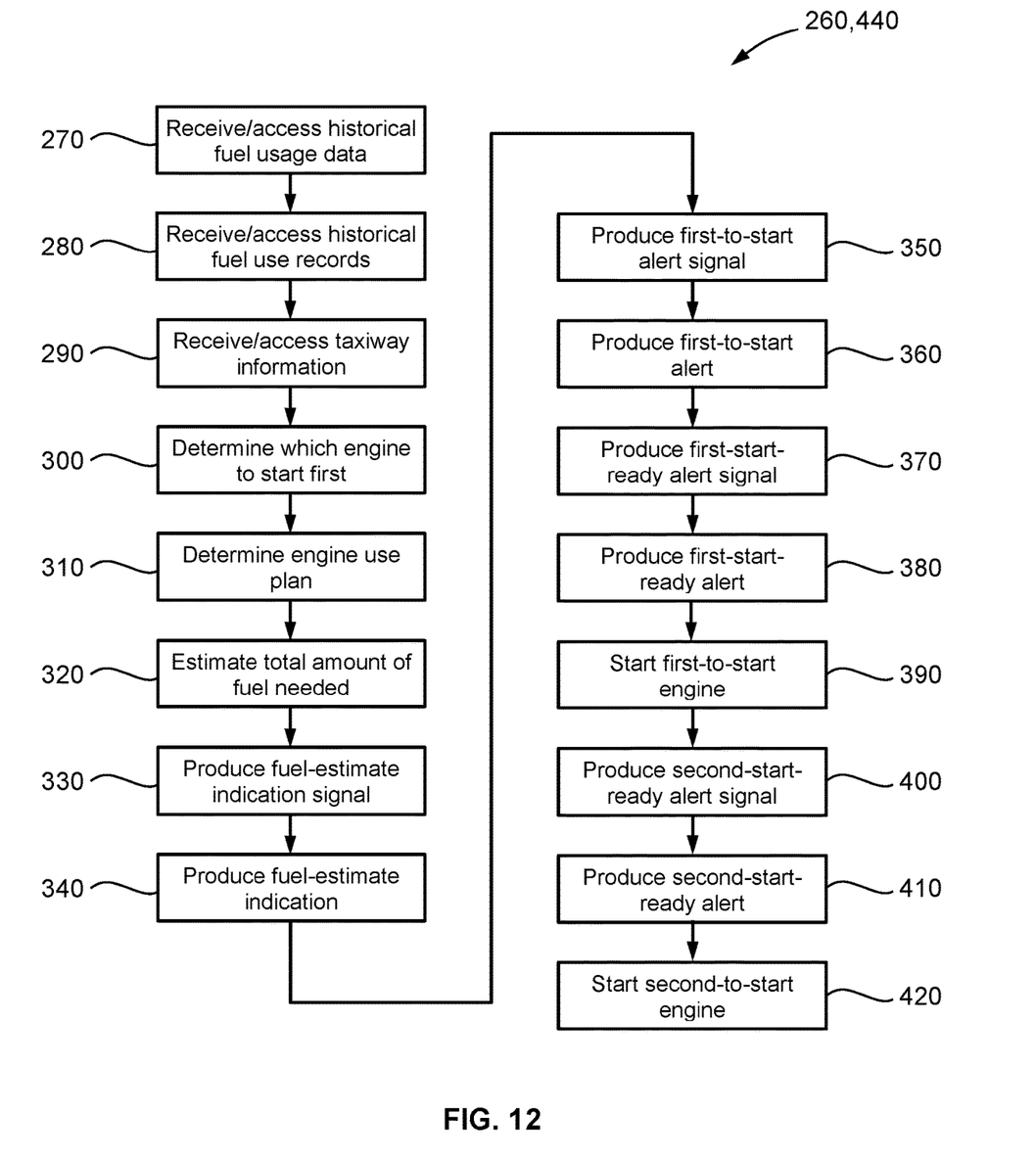
FIG. 12 is a flowchart of a method for determining which engine of an aircraft having a first engine and a second engine to start first for a taxiing operation, and of a method for estimating a total amount of fuel needed by the aircraft for conducting the taxiing operation.

FIG. 12 is a flowchart for determining which engine 14, 16 to start first for a taxiing operation 10 according to the method 260 and system 120 of the abovementioned first and second embodiments, respectively. FIG. 12 is also a flowchart for estimating a total amount of fuel needed 254 by the aircraft 12 for conducting the taxiing operation 10 according to the method 440 and system 430 of the abovementioned third and fourth embodiments, respectively. It should be noted that while FIG. 12 shows steps from block 270 to block 420, each of the methods 260, 440, and each of the systems 120, 430 used to execute the respective methods 260, 440, may include or execute fewer than all of the shown blocks.

For example, according to the first embodiment, as illustrated in FIG. 12, a method 260 is provided for determining which engine of an aircraft 12 having a first engine 14 and a second engine 16 to start first for a taxiing operation 10 along a taxiway 104 at an airport 78. The method 260 includes: (i) at block 270, receiving or accessing historical fuel usage data 158 for each of the first and second engines 14, 16; (ii) at block 290, receiving or accessing taxiway information 160 for the taxiing operation 10; (iii) at block 300, determining which of the first and second engines 14, 16 to start before the other of the first and second engines 14, 16, thereby defining a first-to-start engine 17 and a second-to-start engine 19 respectively, based on optimizing one or more predetermined factors 212; and (iv) at block 360, producing a first-to-start alert 216 indicating which of the first and second engines 14, 16 is the first-to-start engine 17.

According to the second embodiment, as illustrated in FIGS. 2 and 12, a system 120 is provided for determining which engine of an aircraft 12 having a first engine 14 and a second engine 16 to start first for a taxiing operation 10 along a taxiway 104 at an airport 78. The system 120 includes a determination module 122 and an indication module 124 operatively connected with the determination module 122. The system 120 may be configured to execute or effectuate the method 260 of the first embodiment described above. The determination module 122 has a memory 126 configured to store an instruction set 128 and processing circuitry 130 configured to access the memory 126 and execute the instruction set 128 to: (i) receive or access historical fuel usage data 158 for each of the first and second engines 14, 16 (see block 270); (ii) receive or access taxiway information 160 for the taxiing operation 10 (see block 290); (iii) determine which of the first and second engines 14, 16 to start before the other of the first and second engines 14, 16, thereby defining a first-to-start engine 17 and a second-to-start engine 19 respectively, based on optimizing one or more predetermined factors 212 (see block 300); and (iv) produce a first-to-start alert signal 214 based on which of the first and second engines 14, 16 is the first-to-start engine 17 (see block 290). The indication module 124 is configured to receive the first-to-start alert signal 214 from the determination module 122 and produce a first-to-start alert 216 based on the first-to-start alert signal 214 (see block 360).

According to the third embodiment, as illustrated in FIGS. 5 and 12, a method 440 is provided for estimating a total amount of fuel needed 254 by an aircraft 12 for conducting a taxiing operation 10 along a taxiway 104 at an airport 78, with the aircraft 12 having a first engine 14 and a second engine 16. The method 440 includes: (i) at block 270, receiving or accessing historical fuel usage data 158 for each of the first and second engines 14, 16; (ii) at block 290, receiving or accessing taxiway information 160 for the taxiing operation 10; (iii) at block 300, determining which of the first and second engines 14, 16 to start before the other of the first and second engines 14, 16, thereby defining a first-to-start engine 17 and a second-to-start engine 19, respectively, based on optimizing one or more predetermined factors 212; (iv) at block 310, determining an engine use plan 236 for executing the taxiing operation 10 based on the optimizing of the one or more predetermined factors 212 at block 300, wherein the engine use plan 236 includes the steps or actions of starting the first-to-start engine 17 at a first timepoint $T_1$, running the first-to-start engine 17 for a first time period 194 after the first timepoint $T_1$, starting the second-to-start engine 19 at a second timepoint $T_2$ at or after an end of the first time period $T_1$, and running the first-to-start and second-to-start engines 17, 19 for a second time period 196 after the second timepoint $T_2$; (v) at block 320, estimating the total amount of fuel needed 254 for executing the taxiing operation 10 based on the engine use plan 236; and (vi) at block 340, producing a fuel-estimate indication 258 indicating the estimated total amount of fuel needed 254.

According to the fourth embodiment, as illustrated in FIGS. 2, 5 and 12, a system 430 is provided for estimating a total amount of fuel needed 254 by an aircraft 12 for conducting a taxiing operation 10 along a taxiway 104 at an airport 78, with the aircraft 12 having a first engine 14 and a second engine 16. The system 430 includes a determination module 122 and an indication module 124 operatively connected with the determination module 122. The system 430 may be configured to execute or effectuate the method 440 of the third embodiment described above. The determination module 122 has a memory 126 configured to store an instruction set 128 and processing circuitry 130 configured to access the memory 126 and execute the instruction set 128 to: (i) receive or access historical fuel usage data 158 for each of the first and second engines 14, 16 (see block 270); (ii) receive or access taxiway information 160 for the taxiing operation 10 (see block 290); (iii) determine which of the first and second engines 14, 16 to start before the other of the first and second engines 14, 16, thereby defining a first-to-start engine 17 and a second-to-start engine 19, respectively, based on optimizing one or more predetermined factors 212 (see block 300); (iv) determine an engine use plan 236 for executing the taxiing operation 10 based on the optimizing of the one or more predetermined factors 212, wherein the engine use plan 236 includes starting the first-to-start engine 17 at a first timepoint $T_1$, running the first-to-start engine 17 for a first time period 194 after the first timepoint $T_2$, starting the second-to-start engine 19 at a second timepoint $T_2$ at or after an end of the first time period $T_1$, and running the first-to-start and second-to-start engines 17, 19 for a second time period 196 after the second timepoint $T_2$ (see block 310); (v) estimate the total amount of fuel needed 254 for executing the taxiing operation 10 based on the engine use plan 236 (see block 320); and (vi) produce a fuel-estimate indication signal 256 based on the estimated total amount of fuel needed 254 (see block 330). The indication module 124 is configured to receive the fuel-estimate indication signal 256 from the determination module 122 and produce a fuel-estimate indication 258 based on the fuel-estimate indication signal 256 (see block 340).

In the above first embodiment, the method 260 may include, at block 310, determining an engine use plan 236 for executing the taxiing operation 10 based on the optimizing of the one or more predetermined factors 212, wherein the engine use plan 236 includes starting the first-to-start engine 17 at a first timepoint $T_1$, running the first-to-start engine 17 for a first time period 194 after the first timepoint $T_1$, starting the second-to-start engine 19 at a second timepoint $T_2$ at or after an end of the first time period, and running the first-to-start and second-to-start engines 17, 19 for a second time period 196 after the second timepoint $T_2$. Similarly, in the above second embodiment, the determination module 122 may be further configured to determine an engine use plan 236 for executing the taxiing operation 10 based on the optimizing of the one or more predetermined factors 212 (see block 310), wherein the engine use plan 236 includes starting the first-to-start engine 17 at a first timepoint $T_1$, running the first-to-start engine 17 for a first time period 194 after the first timepoint $T_1$, starting the second-to-start engine 19 at a second timepoint $T_2$ at or after an end of the first time period, and running the first-to-start and second-to-start engines 17, 19 for a second time period 196 after the second timepoint $T_2$.

In the above first embodiment, the method 260 may include, at block 320, estimating a total amount of fuel needed 254 for executing the taxiing operation 10 based on the engine use plan 236, and optionally may additionally include one or both of producing a fuel-estimate indication signal 256 based on the estimated total amount of fuel needed 254 (at block 330) and producing a fuel-estimate indication 258 indicating the estimated total amount of fuel needed 254 (at block 340). Similarly, in the above second embodiment, the determination module 122 may be further configured to estimate a total amount of fuel needed 254 for executing the taxiing operation 10 based on the engine use plan 236 (see block 320), and optionally may be further configured to produce a fuel-estimate indication signal 256 based on the estimated total amount of fuel needed 254 (see block 330), and the indication module 124 may be configured to produce a fuel-estimate indication 258 based on the fuel-estimate indication signal 256 (see block 340).

In the above third embodiment, the method 440 may include, at block 330, producing a fuel-estimate indication signal 256 based on the estimated total amount of fuel needed 254.

In one or both of the above first and third embodiments, the method 260, 440 may include, at block 350, producing a first-to-start alert signal 214 based on the determining of which of the first and second engines 14, 16 is the first-to-start engine 17 at block 300. Similarly, in one or both of the above second and fourth embodiments, the determination module 122 may be further configured to produce a first-to-start alert signal 214 based on which of the first and second engines 14, 16 is the first-to-start engine 17 (see block 350). Additionally, in the above third embodiment, the method 440 may include, at block 360, producing a first-to-start alert 216 indicating which of the first and second engines 14, 16 is the first-to-start engine 17, and in the above fourth embodiment, the indication module 124 may be further configured to produce a first-to-start alert 216 based on the first-to-start alert signal 214 (see block 360).

In one or both of the above first and third embodiments, the method 260, 440 may further include, at block 280, receiving or accessing historical fuel use records 159 for one or more previous instances 202 of the taxiing operation 10, wherein the historical fuel use records 159 are for the aircraft 12 and/or for other aircraft 15. Similarly, in one or both of the above second and fourth embodiments, the determination module 122 may be further configured to receive or access historical fuel use records 159 for one or more previous instances 202 of the taxiing operation 10, wherein the historical fuel use records 159 are for the aircraft 12 and/or for other aircraft 15 (see block 280).

In one or both of the above first and third embodiments, the method 260, 440 may further include, at block 380, producing a first-start-ready alert 248 indicating a first OK-to-proceed condition 195 for starting the first-to-start engine 17, and optionally may further include, at block 410, producing a second-start-ready alert 252 indicating a second OK-to-proceed condition 197 for starting the second-to-start engine 19. Additionally, in one or both of the above first and third embodiments, the method 260, 440 may further include, at block 370, producing a first-start-ready alert signal 246 based on the engine use plan 236, and optionally may further include, at block 400, producing a second-start-ready alert signal 250 based on the engine use plan 236.

In one or both of the above second and fourth embodiments, the indication module 124 may be further configured to produce a first-start-ready alert 248 indicating a first OK-to-proceed condition 195 for starting the first-to-start engine 17 (see block 380), and optionally may be further configured to produce a second-start-ready alert 252 indicating a second OK-to-proceed condition 197 for starting the second-to-start engine 19 (see block 410). Additionally, in one or both of the above second and fourth embodiments, the determination module 122 may be further configured to produce a first-start-ready alert signal 246 based on the engine use plan 236 (see block 370), and optionally may be further configured to produce a second-start-ready alert signal 250 based on the engine use plan 236 (see block 400).

In one or both of the above first and third embodiments, the method 260, 440 may further include, at block 390, starting the first-to-start engine 17, and optionally may further include, at block 420, starting the second-to-start engine 19. Similarly, in one or both of the above second and fourth embodiments, the determination module 122 may be further configured to start the first-to-start engine 17 (see block 390), and optionally may be further configured to start the second-to-start engine 19 (see block 420).

In one or more of the above embodiments, and as illustrated in FIGS. 6, 8 and 10, the predetermined factors 212 may include one or more of minimizing a total amount of fuel consumed 224 for executing the taxiing operation 10 by the first and second engines 14, 16 (block 222), prioritizing whichever of the first and second engines 14, 16 was started first in a most previous operating cycle 210 (block 226), prioritizing whichever of the first and second engines 14, 16 has a lower number of cumulative operating hours 230 (block 228), and minimizing brake wear 234 for the aircraft 12 based on a number of turns 112 present in the taxiway 104 (block 232). The predetermined factors 212 may be received by the aircraft 12 from one or more external databases, services or sources 84 (e.g., via the transceiver 70), and/or the predetermined factors 212 may be recalled from an onboard storage medium (e.g., from memory 126 by processing circuitry 130, and/or from storage medium 68 by accessing/processing circuit 64).

In one or more of the above embodiments, and as illustrated in FIGS. 3 and 7, the taxiway 104 may include a plurality of taxiway features 105, including one or more of a taxiway segment 106, a runway (such as the arriving runway 100 and the departing runway 102), an ascending ramp or segment 108, a descending ramp or segment 110, a divot 114 and a turn 112. Others 116 of such taxiway features 105 are also possible. Each taxiway feature 105 may be associated with a respective subset 162 of the taxiway information 160. Each subset 162 of the taxiway information 160 may include one or more of a respective set of latitude-longitude coordinates 164 representing a location 166 of the associated taxiway feature 105, a respective set of one or more vectors 168 representing or characterizing a spatial orientation or directionality 170 of the associated taxiway feature 105, a respective size 172 of the associated taxiway feature 105, a respective shape 174 of the associated taxiway feature 105, a respective slope 176 of the associated taxiway feature 105, a respective elevation 178 of the associated taxiway feature 105, a respective type 180 of the associated taxiway feature 105, and a respective severity or impact rating 182 of how the associated taxiway feature 105 is likely to affect movement of the aircraft 12 across the taxiway feature 105.

In one or more of the above embodiments, and as illustrated in FIG. 7, the taxiway information 160 may include data from one or more Notice to Air Mission (NOTAM) reports 184, which are reports filed by flight personnel aboard aircrafts for use by other personnel aboard other aircrafts regarding information or issues that have not been previously known or announced. For example, a NOTAM 184 may report sudden severe weather that has been encountered, newly discovered debris on a taxiway 104, etc. More specifically, the NOTAM data may include one or both of historical data 186 from previous NOTAM reports 188 and real-time data 190 from current NOTAM reports 192.

In one or more of the above embodiments, and as illustrated in FIG. 2, the alert 142, the first-to-start alert 216, the second-to-start alert 220, the first-start-ready alert 248, the second-start-ready alert 252 and the fuel estimate indication 258 may each comprise one or more of a visual indication 43 on a display device 30, an auditory indication 51 through an auditory device 44, and a vibratory indication 55 from a vibrational device 52. These various alerts and indications may each be triggered or initiated by a respective alert signal 136 (for the alert 142), a respective first-to-start alert signal 214 (for the first-to-start alert 216), a respective second-to-start alert signal 218 (for the second-to-start alert 220), a respective first-start-ready alert signal 246 (for the first-start-ready alert 248), a respective second-start-ready alert signal 250 (for the second-start-ready alert 252) and a respective fuel estimate indication signal 256 (for the fuel estimate indication 258), as may be generated by the determination module 122 and received by the indication module 124.

In one or more of the above embodiments, the first-start-ready alert 248 (and optionally the first-start-ready alert signal 246) may be based on completing the determination 123 of which engine 14, 16 should be started first, and/or on determining some or all of the engine use plan 236. For example, once a determination 123 has been made as to which engine 14, 16 should be the first-to-start engine 17, then a first-start-ready alert signal 246 may be sent by the determination module 122 to the indication module 124, and the indication module 124 may then in turn send a command or power signal to one or more of the display, auditory and vibrational devices 30, 44, 52 so that a first-start-ready alert 248 is effected in order to inform the pilot 26. Similarly, the second-start-ready alert 252 (and optionally the second-start-ready alert signal 250) may also be based on completing the determination 123 and/or on determining some or all of the engine use plan 236.

While various steps of the methods 260, 440 have been described as being separate blocks, and various functions of the system 120, 430 have been described as being separate modules or elements, it may be noted that two or more steps may be combined into fewer blocks, and two or more functions may be combined into fewer modules or elements. Similarly, some steps described as a single block may be separated into two or more blocks, and some functions described as a single module or element may be separated into two or more modules or elements. Additionally, the order of the steps or blocks described herein may be rearranged in one or more different orders, and the arrangement of the functions, modules and elements may be rearranged into one or more different arrangements. Further, note that the controller 71 may optionally include some or all of the structure and/or function of the determination module 122 and/or of the indication module 124.

As used herein, a "module" may include hardware and/or software, including executable instructions, for receiving one or more inputs, processing the one or more inputs, and providing one or more corresponding outputs. Also note that at some points throughout the present disclosure, reference may be made to a singular input, output, element, etc., while at other points reference may be made to plural/multiple inputs, outputs, elements, etc. Thus, weight should not be given to whether the input(s), output(s), element(s), etc. are used in the singular or plural form at any particular point in the present disclosure, as the singular and plural uses of such words should be viewed as being interchangeable, unless the specific context dictates otherwise.

The above description is intended to be illustrative, and not restrictive. While the dimensions and types of materials described herein are intended to be illustrative, they are by no means limiting and are exemplary embodiments. In the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "mostly", "mainly", "for the most part", "to a significant extent", "to a large degree" and/or "at least 51 to 99% out of a possible extent of 100%", and do not necessarily mean "perfectly", "completely", "strictly", "entirely" or "100%". Additionally, the word "proximate" may be used herein to describe the location of an object or portion thereof with respect to another object or portion thereof, and/or to describe the positional relationship of two objects or their respective portions thereof with respect to each other, and may mean "near", "adjacent", "close to", "close by", "at" or the like.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:
1. A method for determining which engine of an aircraft having a first engine and a second engine to start first for a taxiing operation along a taxiway at an airport, comprising:
receiving or accessing historical fuel usage data for each of the first and second engines;

receiving or accessing taxiway information for the taxiing operation;

optimizing one or more predetermined factors based at least on the historical fuel usage data or the taxiway information;

selecting one of the first and second engines to start before the other of the first and second engines, thereby defining a first-to-start engine and a second-to-start engine, respectively, based on the optimizing the one or more predetermined factors;

producing a first-to-start alert indicating which of the first and second engines is the first-to-start engine based on the selecting; and starting the first-to-start engine based on the selecting.

2. The method of claim 1, wherein the predetermined factors include one or more of:

minimizing a total amount of fuel consumed for executing the taxiing operation by the first and second engines;

prioritizing whichever of the first and second engines was started first in a most previous operating cycle;

prioritizing whichever of the first and second engines has a lower number of cumulative operating hours; and minimizing brake wear for the aircraft based on a number of turns present in the taxiway.

3. The method of claim 1, further comprising:

receiving or accessing historical fuel use records for one or more previous instances of the taxiing operation.

4. The method of claim 3, wherein the historical fuel use records are for the aircraft and/or for other aircraft.

5. The method of claim 1, wherein the taxiway includes a plurality of taxiway features, wherein each taxiway feature is associated with a respective subset of the taxiway information, and wherein each subset of the taxiway information includes one or more of:

a respective set of latitude-longitude coordinates representing a location of the associated taxiway feature;

a respective set of one or more vectors representing a spatial orientation of the associated taxiway feature;

a respective size of the associated taxiway feature;

a respective shape of the associated taxiway feature;

a respective slope of the associated taxiway feature;

a respective elevation of the associated taxiway feature; and a respective severity rating of how the associated taxiway feature affects movement of the aircraft thereacross.

6. The method of claim 5, wherein the taxiway features include one or more of a taxiway segment, a runway, an ascending ramp, a descending ramp, a divot and a turn.

7. The method of claim 1, wherein the taxiway information includes one or both of historical data from previous Notice to Air Mission (NOTAM) reports and real-time data from current NOTAM reports.

8. The method of claim 1, further comprising:

determining an engine use plan for executing the taxiing operation based on the optimizing of the one or more predetermined factors, wherein the engine use plan includes starting the first-to-start engine at a first timepoint, running the first-to-start engine for a first time period after the first timepoint, starting the second-to-start engine at a second timepoint at or after an end of the first time period, and running the first-to-start and second-to-start engines for a second time period after the second timepoint.

9. The method of claim 8, further comprising:

producing a first-start-ready alert indicating a first OK-to-proceed condition for starting the first-to-start engine.

10. The method of claim 9, further comprising:

producing a second-start-ready alert indicating a second OK-to-proceed condition for starting the second-to-start engine; and starting the second-to-start engine.

11. The method of claim 8, further comprising:

estimating a total amount of fuel needed for executing the taxiing operation based on the engine use plan.

12. The method of claim 11, further comprising:

producing a fuel-estimate indication indicating the estimated total amount of fuel needed.

13. A system for determining which engine of an aircraft having a first engine and a second engine to start first for a taxiing operation along a taxiway at an airport, comprising:

a determination module having a memory configured to store an instruction set and processing circuitry configured to access the memory and execute the instruction set to:

receive or access historical fuel usage data for each of the first and second engines;

receive or access taxiway information for the taxiing operation;

optimize one or more predetermined factors based on the historical fuel usage data or the taxiway information;

select one of the first and second engines to start before the other of the first and second engines, thereby defining a first-to-start engine and a second-to-start engine, respectively, based on optimizing the one or more predetermined factors; and produce a first-to-start alert signal based on the select step; and the first-to-start engine configured to started based on the select step.

14. The system of claim 13, wherein the determination module is further configured to do one or more of the following:

receive or access historical fuel use records for one or more previous instances of the taxiing operation;

determine an engine use plan for executing the taxiing operation based on the optimizing of the one or more predetermined factors, wherein the engine use plan includes starting the first-to-start engine at a first timepoint, running the first-to-start engine for a first time period after the first timepoint, starting the second-to-start engine at a second timepoint at or after an end of the first time period, and running the first-to-start and second-to-start engines for a second time period after the second timepoint;

produce a first-start-ready alert signal based on the engine use plan;

produce a second-start-ready alert signal based on the engine use plan;

estimate a total amount of fuel needed for executing the taxiing operation based on the engine use plan; and produce a fuel-estimate indication signal based on the estimated total amount of fuel needed.

15. The system of claim 13, wherein an indication module includes processing circuitry that is configured to receive the first-to-start alert signal and produce a first-to-start alert based on the first-to-start alert signal.

16. The system of claim 15, wherein the first-to-start alert comprises one or more of a visual indication on a display device, an auditory indication through an auditory device, and a vibratory indication from a vibrational device.

17. A method for estimating a total amount of fuel needed by an aircraft for conducting a taxiing operation along a taxiway at an airport, the aircraft having a first engine and a second engine, the method comprising:

receiving or accessing historical fuel usage data for each of the first and second engines;

receiving or accessing taxiway information for the taxiing operation;

optimizing one or more predetermined factors based on the historical fuel usage data or the taxiway information;

selecting one of the first and second engines to start before the other of the first and second engines, thereby defining a first-to-start engine and a second-to-start engine, respectively, based on the optimizing the one or more predetermined factors;

determining an engine use plan for executing the taxiing operation based on the optimizing of the one or more predetermined factors, wherein the engine use plan includes starting the first-to-start engine at a first timepoint, running the first-to-start engine for a first time period after the first timepoint, starting the second-to-start engine at a second timepoint at or after an end of the first time period, and running the first-to-start and second-to-start engines for a second time period after the second timepoint based on the selecting step;

starting the first-to-start engine at the first timepoint based on the selecting step;

estimating the total amount of fuel needed for executing the taxiing operation based on the engine use plan;

producing a fuel-estimate indication indicating the estimated total amount of fuel needed.

18. The method of claim 17, wherein the predetermined factors include one or more of:

minimizing a total amount of fuel consumed for executing the taxiing operation by the first and second engines;

prioritizing whichever of the first and second engines was started first in a most previous operating cycle;

prioritizing whichever of the first and second engines has a lower number of cumulative operating hours; and minimizing brake wear for the aircraft based on a number of turns present in the taxiway.

19. The method of claim 17, further comprising:

receiving or accessing historical fuel use records for one or more previous instances of the taxiing operation, wherein the historical fuel use records are for the aircraft and/or for other aircraft.

20. The method of claim 17, wherein the taxiway includes a plurality of taxiway features including one or more of a taxiway segment, a runway, an ascending ramp, a descending ramp, a divot and a turn, wherein each taxiway feature is associated with a respective subset of the taxiway information, and wherein each subset of the taxiway information includes one or more of:

a respective set of latitude-longitude coordinates representing a location of the associated taxiway feature;

a respective set of one or more vectors representing a spatial orientation of the associated taxiway feature;

a respective size of the associated taxiway feature;

a respective shape of the associated taxiway feature;

a respective slope of the associated taxiway feature;

a respective directionality of the associated taxiway feature;

and a respective severity rating of how the associated taxiway feature affects movement of the aircraft thereacross.

* * * * *

UNITED STATES PATENT AND TRADEMARK OFFICE
CERTIFICATE OF CORRECTION

PATENT NO. : 12,384,557 B2  
APPLICATION NO. : 18/163678  
DATED : August 12, 2025  
INVENTOR(S) : Schwartz et al.

Page 1 of 1

It is certified that error appears in the above-identified patent and that said Letters Patent is hereby corrected as shown below:

In the Claims

Claim 13 at Column 22, Line 33, delete the word "started" and replace with "start"

Signed and Sealed this  
Twenty-third Day of September, 2025

John A. Squires  
*Director of the United States Patent and Trademark Office*